Nov. 16, 1948.  A. L. BURLESON  2,454,134
ROTARY DRUM FILTER
Filed Jan. 8, 1945  6 Sheets-Sheet 1

INVENTOR.
AMBROSE L. BURLESON
BY
HIS ATTORNEY

Nov. 16, 1948.　　　　　A. L. BURLESON　　　　　2,454,134
ROTARY DRUM FILTER
Filed Jan. 8, 1945　　　　　　　　　　　　　　6 Sheets-Sheet 2

INVENTOR.
AMBROSE L. BURLESON
BY
HIS ATTORNEY

Nov. 16, 1948.                A. L. BURLESON                 2,454,134
                             ROTARY DRUM FILTER
Filed Jan. 8, 1945                                      6 Sheets-Sheet 4

INVENTOR.
AMBROSE L. BURLESON
BY
HIS ATTORNEY

Nov. 16, 1948.  A. L. BURLESON  2,454,134
ROTARY DRUM FILTER
Filed Jan. 8, 1945  6 Sheets-Sheet 5

INVENTOR.
AMBROSE L. BURLESON
BY
HIS ATTORNEY

Patented Nov. 16, 1948

2,454,134

UNITED STATES PATENT OFFICE 2,454,134

ROTARY DRUM FILTER

Ambrose L. Burleson, Berkeley, Calif.

Application January 8, 1945, Serial No. 571,756

13 Claims. (Cl. 210—202)

1

This invention relates to rotary drum type filters as used in industrial plants, mining, and large filtering operations, and has for its principal object improvements in construction of such filters where filtering is accomplished on both the interior as well as the exterior of the drum.

One of the features of my improved construction provides for arcuate covering of the inner or concave filtering screens with cloth as well as the outer or convex surface of the outer filtering screens.

Other features provide for ease of application of the filtering cloth to sections of the drum, and ease of applying and removal of such sections, while still another feature provides for protecting the inner concave cloth filtering sheets from injury by scrapers removing the sludge therefrom as the drum revolves, and similarly the outer layer of filtering cloth.

Other features and advantages of my improved construction will appear in the following description and accompanying drawings.

Fig. 10 is an end view of Fig. 9.

Fig. 12 is an end view of Fig. 11.

Fig. 14 is a side elevation of one of the combined cloth stretching bars and scraper guards.

Fig. 15 is an enlarged detail of one of the re-

2 turned end wall edges of the inner screen sections showing the manner of securing the cloth covering to the section.

Before describing the drawings in detail it will aid in their understanding to state that the filter shown in the drawings to illustrate the embodiment of my improvements, comprises a horizontally disposed relatively short cylinder or drum 1 supported from one end by a head 2, with an extended hub 3 secured to a shaft 4 supported at one end in a bearing 5 and with the hub rotatably supported in a bearing 6. The end of the drum remote from the hub is freely open, and the drum is mounted upon and over a tank of liquid to be filtered. The arcuate wall of the drum is hollow, and formed of two concentrically spaced sheet metal cylinders 27 and 26 interiorly partitioned into sections or compartments by longitudinally extending walls 30 and fitted with outwardly spaced exterior, and inwardly spaced interior, perforated sheet metal arcuate screen plate surfaces 33 and 37 respectively, preferably respectively covered exteriorly 8 and interiorly 9 with filtering cloth which follows the arcuate surfaces of the sheet metal screen plates. The filtering of the liquid from the tank takes place by suction or flow of the liquid to the interior of the hollow wall of the drum both from the exterior as well as from the interior simultaneously, and the sludge from both surfaces is simultaneously removed respectively by scrapers 10 and 11 supported with their scraping edges very close to their respective cloth filter surfaces.

Figure 1:
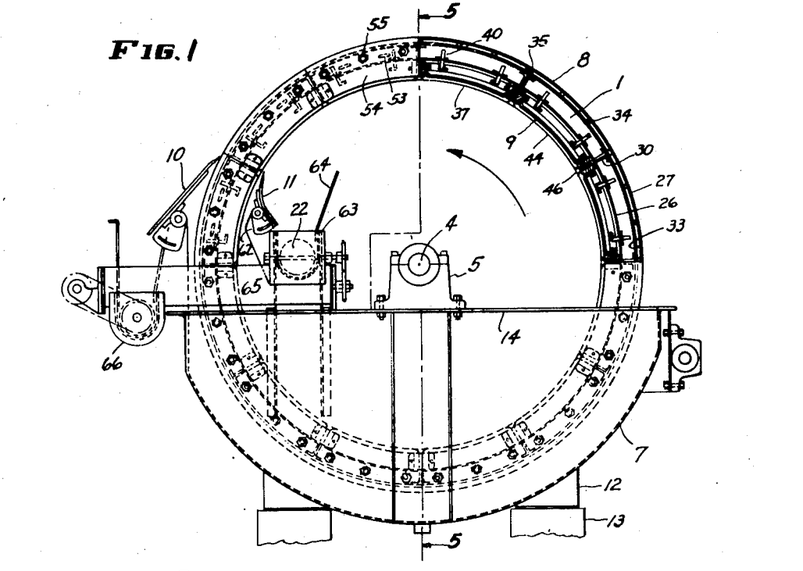
Fig. 1 is an end view showing the open end of the revolving drum, and with a partial sectional portion taken along the line 1—1 of Fig. 5.

In further detail the construction shown in the drawings comprises the conventional tank 7 for the liquid to be filtered, and which tank is suitably supported as by legs 12 on a foundation 13. Mounted on the upper flange 14 of this tank is the drum supporting and driving head 2 which is keyed to the shaft 4 in turn supported by an outboard bearing 5 at the open end of the drum as shown in Fig. 1. The drum supporting and driving head 2 has a hollow hub 3 extended into a combined bearing and enclosed worm gear housing 6 supported by the tank. A worm gear 15 is keyed to the hub 3 of the head for driving the drum (in direction of the arrow shown in Fig. 1) as by a worm dotted at 16, in turn driven by any suitable means not shown.

Shaft 4 revolves with the drum and serves to overcome the cantilever effect which would be present if the drive head were simply supported by the main bearing 6.

Head 2 is formed or provided with a number of radial pipes or channels 17, one for each division or screen section of the drum. These channels 17 are extended through the hub 3 as at 18 and it is through these channels that the tank liquid is removed after passing through the filter surfaces, all as well known in the art.

Figures 5, 5A:
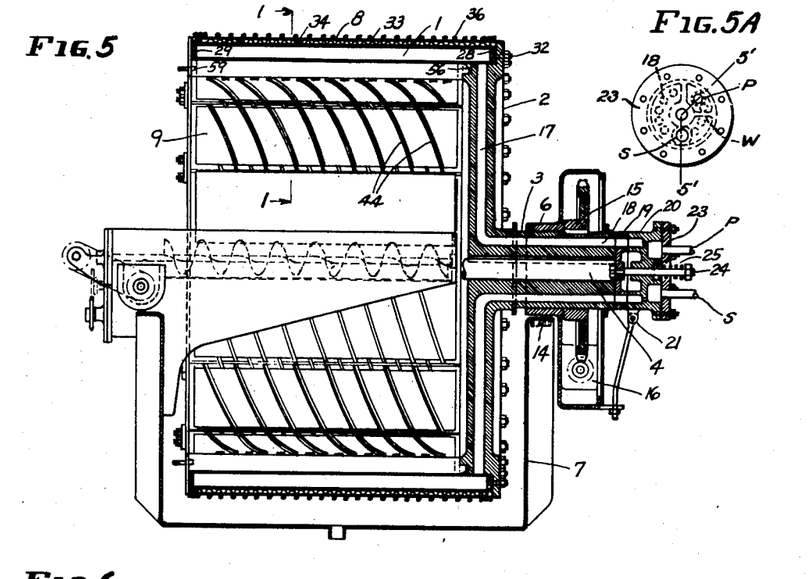
Fig. 5 is a section on line 5—5 of Fig. 1.
Fig. 5A is an end view of the valve cover indicating the suction and pressure spaces also indicating by line 5'—5' the section of the valve shown in Fig. 5.

Member 19 is a wearing plate with holes drilled to match the channels 18 of the hub, and the plate is secured to the end of the hub by suitable studs not shown. Member 20 is a discharge valve which is held stationary by a brace 21. This discharge valve is so constructed that suction or air pressure may be maintained at the proper time in the various filtering sections as they revolve, in the well-known way with revolving filters. When the sections are submerged and after they come out of the tank as the drum revolves they are kept under suction. When reaching a point over the conveyor 22 the valve passageways automatically allow air under pressure to be injected to the section over the conveyor thus tending to loosen the sludge or filter cake and facilitate its removal by a scraper 11 as well as by gravity to fall into the conveyor. Such a valve and its operating connections are well-known in the art and need no detailed description, as not claimed herein, though in the particular showing of Figs. 5 and 5A it may be stated that member 23 is the cover plate through which the suction (S) and pressure (P) pipe connections are made, as well understood. Member 24 is a bolt and 25 is a tension spring which keep the moving surfaces between members 19 and 20 in close sliding contact. In Fig. 5A the relative positions of the suction (S) and pressure (P) connections, and interior walls W to separate the suction and pressure spaces of the valve are indicated.

Figure 2:
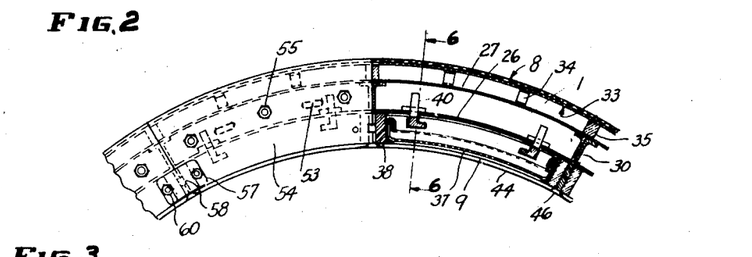
Fig. 2 is an enlarged view of the two upper portions of Fig. 1.
Figure 3:
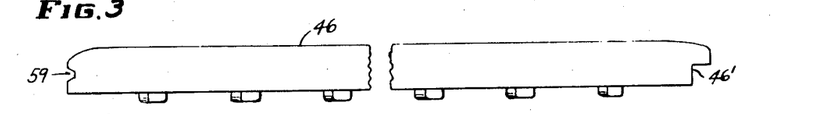
Fig. 3 is a detail in elevation of one of the bars which bridge the inner screen frames, to support the inner scraper.
Figure 4:
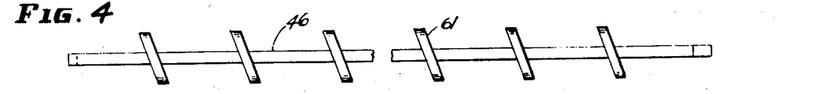
Fig. 4 is a plan view of Fig. 3 as seen from within the drum when the bridge bar is in place.

The hollow wall of the drum which is divided into compartments and carries the exterior and interior filter plates or surfaces comprises two sheet metal cylinders 26 and 27 spaced apart and closed at their ends by spacing rings 28 and 29 all welded or otherwise secured together, while extending lengthwise between these two sheet metal cylinders are reinforcing or stiffening T bars 30 preferably formed of two angle bars secured together back to back as indicated in Fig. 2 and welded in place. These bars 30 also divide the space between cylinders 26 and 27 into the same number of compartments as there are removable interior filter plates. Assemblage 26 to 30 is supported by fitting over an annular shoulder 31 on head 2 and being bolted thereto through end ring 28 as by bolts 32.

The exterior filter surface is composite in nature and comprises a perforated screen plate 33 supported by corrugated spacing strips 34, and solid strips 35 welded in place and aligned over dividing channels 30 to divide the outer filtering surface into corresponding sections.

The exterior filter cloth 8 is stretched smoothly over perforated plate 33 and suitably secured in place by a wire winding 36 as understood in the art.

Figure 6:
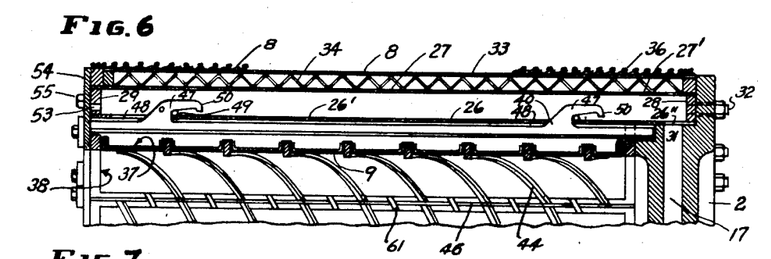
Fig. 6 is an enlarged section taken along line 6—6 of Fig. 2.

Sheet 26 of the double walled cylinder is perforated within each section as at 26' and also provided with matching openings 26'' for each head channel 17, while sheet 27 is provided with some large holes 27' adjacent the head 2, all as indicated in Fig. 6.

Liquid in coming through the outer filter surface flows along the space between plates 27 and 33 and through holes 27' into the space between plates 26 and 27, from where it passes into the channels 17 and down or up, depending upon the position of the section with respect to the cycle of rotation, to the discharge valve 20. Liquid coming through the interior filter plates 37 passes through perforations 26' in drum sheet 26 to the space between sheets 26 and 27 and also flows toward channel 17 and discharge valve 20.

Figure 7:
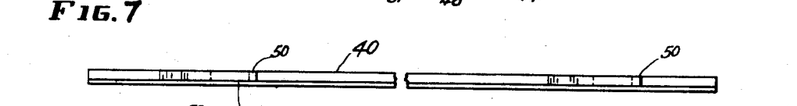
Fig. 7 is a plan view of one of the inner screen section locking bars.
Figure 8:
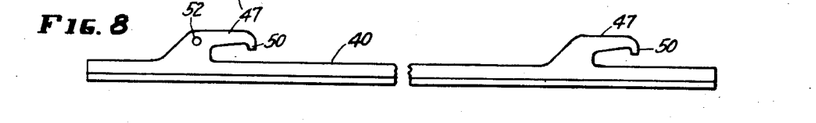
Fig. 8 is a side elevation of the locking bar.

The interior filter plates or panels are constructed in such a manner that they can easily be removed or slipped into place within the drum. These panels are best shown in Figs. 9 to 15 inclusive, and from which it will be seen that the assemblage comprises an enclosing frame 38 which has one side 38' removable and held in place as by screws indicated. The ends of the frame 38 are arched on their inner edges to form a concentric circle within the drum, and these ends are provided with L-shaped slots 39 to cooperate with the locking bars 40 of Figs. 7 and 8 to hold them in place within the drum.

Figures 11, 13:
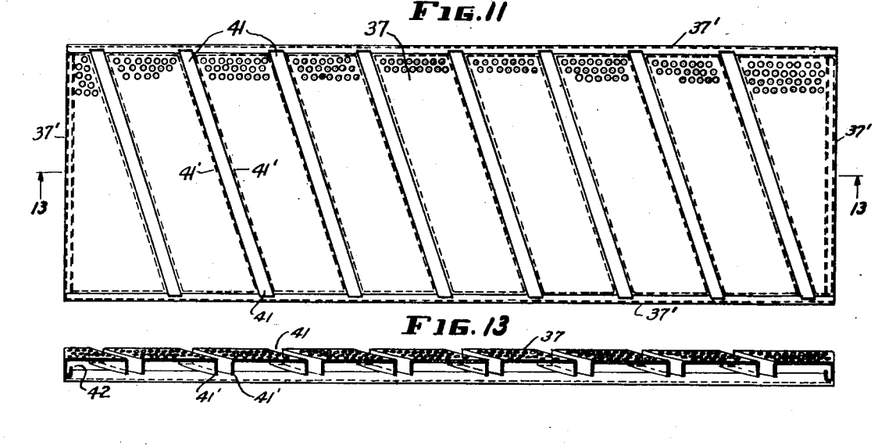
Fig. 11 is an inner plan view of the perforated screen plate of one of the inner screen assemblies.
Fig. 13 is a longitudinal section of the screen plate of Fig. 11 taken on the line 13—13 thereof.
Figure 16:
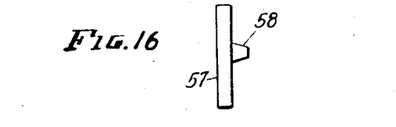
Fig. 16 is an enlarged edge view of one of the section end joint straddling plates showing the lug which supports the outer end of one of the inner screen section bridging bars.
Figure 17:
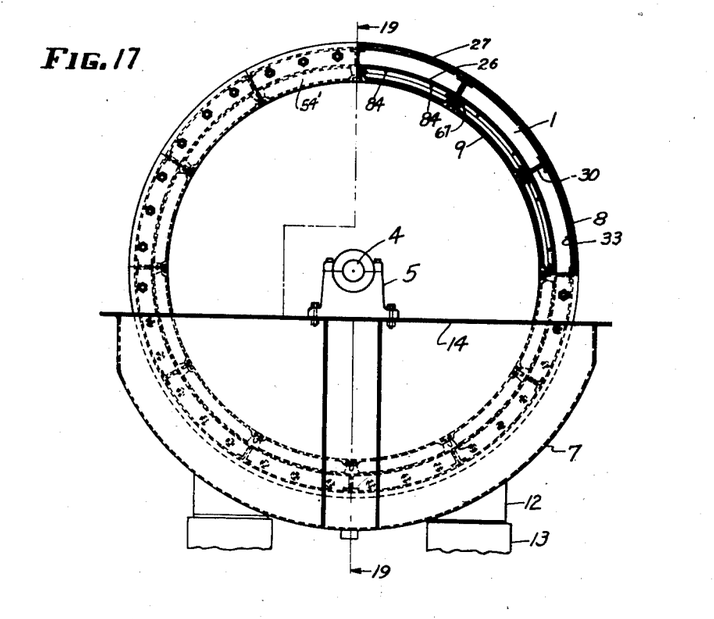
Fig. 17 is an end elevation showing the open end of the revolving drum, with portion cut away to show the modified means of supporting the inner screen sections.

Fitting within each frame 38 is an especially formed perforated sheet metal screen plate 37 which forms a support for the interior cloth covering 9 to form the inner composite filtering sheet. This sheet metal screen (as viewed from within the drum) is an elongated panel (Fig. 11) with turned back marginal walls 37' and with inner face curved concentric with the drum, and with diagonally extending channels or slots 41 extending across it as shown in Fig. 11, each channel having side walls 41' formed by turning back the metal of the plate, so that in fact the plate consists of a plurality of transversely extending angular panel spaced from one another to provide the diagonally extending slots or channels 41.

The diagonal channels 41 are of lesser depth than the outer or marginal walls 37' thus leaving the diagonal panels all rigidly connected across the ends of the grooves by the remaining depth of the marginal walls. The extreme end walls of the screen plate are of somewhat lesser depth than the two long side walls, but all four walls are formed with re-entrant interior margins or edges as indicated at 42 to receive the margins 9' of the cloth covering 9 as shown in the enlarged detail Fig. 15, and where the cloth which covers the concave interior surface of screen plates 37 is folded over behind margin 42 and held in place as by elongated wedge strips 43 (which may be of wood, plastic, or metal) and which are put in place by tilting them over the edge 42 and forcing them down in the space behind as with a screw driver or other convenient tool, so as to wedge the cloth tightly in place.

In covering one of the screen plates with cloth the cloth is first cut to size to allow for all margins to be folded back of the re-entrant margins of the plate as described, and also long enough to provide for passing under and around cloth stretching bars 44 one of which is forced into each diagonal slot 41. These stretching bars are shown detached in Fig. 14 and they are of a thickness to fit tightly into the slots with the cloth. The bars are curved to match the transverse curve of the screen plate, and of a height to project outward from the cloth slightly to afford a contact surface for the sludge scraping blade so that it will clear the cloth, and the ends of the bars are slightly rounded as shown at 44' in Fig. 10 so that the sludge scraper blade will not catch on them. These bars 44 are applied successively from the end of the screen plate to which the margin was first attached as described, and while stretching and smoothing out the cloth over each diagonal panel as the work proceeds. By this means the cloth covering assumes a concave surface fitting snugly against the concave surface of the screen plate. The final free end and side margins of the cloth are then tightly folded back over the re-entrant margins of the screen plate and held with wedge strips as described for Fig. 15.

Figure 9:
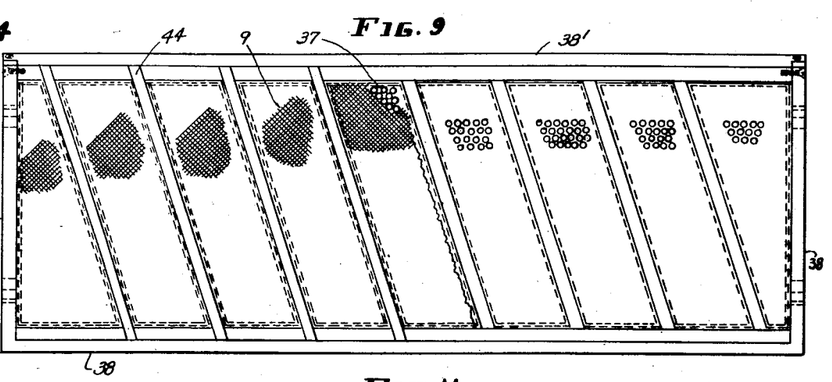
Fig. 9 is an inner plan view of an assembly of one of the inner filter plates with cloth covering in place.
Figures 10, 12, 14, 15:
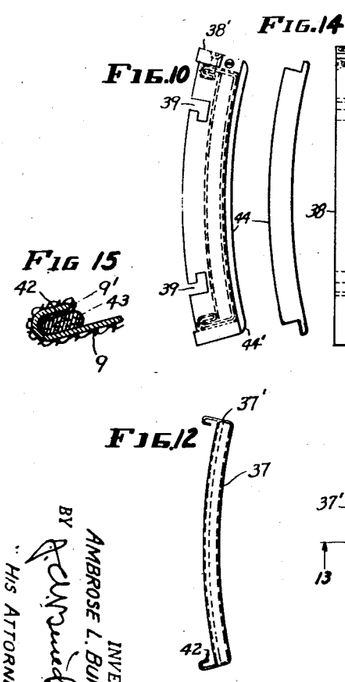

After the interior screen section plate is thus covered with cloth and the stretching bars are all in place, it is inserted into the frame 38 from the open side and the loose bar 38' is then fastened in place as shown in Figs. 9 and 10 thus completing the assemblage of the interior screen sections ready to place within the drum.

These interior screen sections are slid endwise from the open end of the drum with their frames 38 fitting tightly against the inner surface of the inner perforated sheet metal cylinder 26 as shown best in the right-hand sectional portion of Fig. 2 and wherein the frame 38 is positioned in alignment with one of the drum hollow wall compartments (between dividing walls 30) and held in place by a pair of locking bars 40 and separated from the next adjacent screen section by bridge bars 46.

The locking bars 40 are slidably but permanently supported from the inner cylindrical shell 26 by means of hook-like tapered lugs 47 (see Figs. 6, 7 and 8) which extend through slots 48 in shell 26 and slidably ride over rounded fulcrums or transversely extending pins 49 welded or otherwise secured to shell 26 which engage the lower tapered edges of the lugs 47 so that as the bar 40 is moved longitudinally inward it will gradually approach the shell 26 due to the wedge-like effect of the tapered lugs 47, and when pulled out the bar will move slightly further away from shell 26 until the hooked ends 50 of the lugs 47 prevent further withdrawal. Each bar is L-shaped in cross section and of a size to fit freely in the L-shaped slots 39 formed in opposite ends of the interior screen frame 38 so that the frame may be slid longitudinally upon a pair of the bars (when extended) to be suspended thereon as shown in Fig. 2, and upon then pushing the bars inward the cam-like action of the lugs 47 described will cause the screen section frames to be drawn up tightly against the inner curved wall of inner drum shell 26.

To facilitate pulling out the locking bars to release the screen sections each bar is provided with a hole 52 which may be reached by a suitable hooked rod inserted through slots 53 provided in end ring 29 for this purpose.

After inserting the interior screen sections as described they are closed in at the open end of the drum as by segment end plates 54 secured to outer ring 29 by cap screws 55. After this the bridge bars 46 are inserted, one between each screen section, by hooking a shouldered end 46' over a notch 56 formed in the inner periphery of the drum head 2, then pushing the outer end of the bridge bar up snug between the frames 38 and securing it in place by applying one of the joint straddling plates 57 across the joint between two of the end plates 54. This plate 57 is provided with an inwardly directed tapered lug 58 which projects through an opening provided between the adjacent ends of the end plates 54, and which lug enters a depression 59 at the outer end of the bridge bar. Plate 57 is secured to the end plates 54 as by cap screws 60.

Bridge bars 46 are each provided with narrow transversely extending fingers 61 arranged angularly to correspond with the angular arrangement of the cloth stretching bars 44 and spaced to come between them and straddle two adjacent long sides of screen frames 38 so as to form a series of supporting bridges for the sludge scraping blade to ride on in passing from one screen section to the other. These fingers 61 project the same height beyond the cloth screen surface as do the bars 44 and are similarly rounded at their ends, thus forming with the bars 44 a continuous internal circular support for the interior scraper blade. The angular arrangement of bars 44 and fingers 61 forms a continuous helix insuring even wear along the scraper blade, and which blade is preferably of a softer metal.

The interior scraper blade is indicated at 11 and extends the length of the screen segments. It is mounted on an adjustable carriage 62 and is arranged to drop the sludge to a spiral conveyor box 63 fitted with a splash guard plate 64. This conveyor is of conventional construction emptying into a cross conveyor 65 in turn emptying into another longitudinal conveyor 66 receiving the sludge from a similar scraper blade 10 applied to the outer screen of the drum and adjusted to bear against the wire wrapping of the cloth in the conventional manner. The conveyors are driven in the known manner to discharge the sludge to any point desired, no detailed description is therefore required.

It is of course obvious that the apparatus should be constructed of rust-proof materials or properly rust-proofed all over after making.

In the modification shown in Figs. 17 to 25 the main drum structure is the same as previously described in consisting of a hollow double walled cylinder with outer and inner screen surfaces, the only difference being the specific construction of the inner screen sections and mode of securing in place. Accordingly only so much of the drum and adjacent features as are necessary for a clear understanding of the new features are shown and where the parts are identical with the showing already described they bear identical designating numerals and therefore need not be again described.

Figure 18:
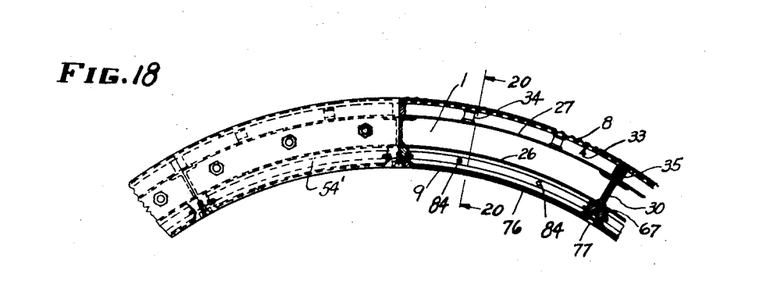
Fig. 18 is an enlarged view of the upper portion of Fig. 17.
Figure 19:
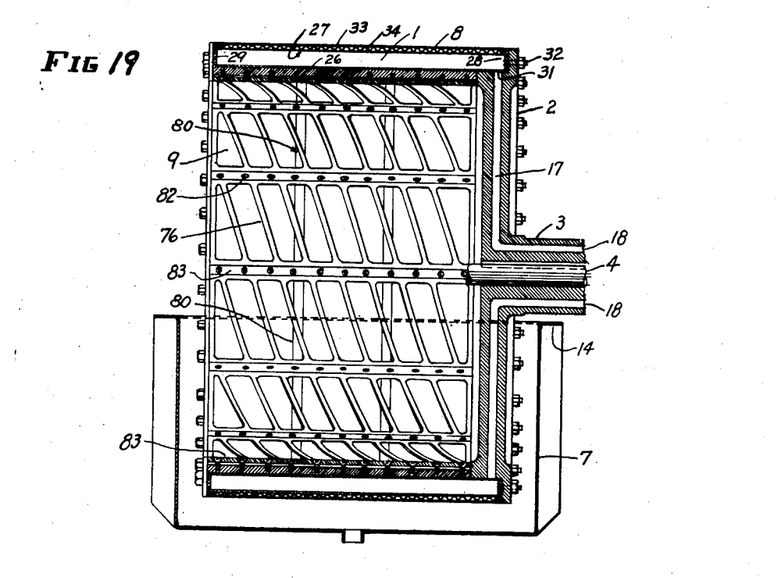
Fig. 19 is a section taken on line 19—19 of Fig. 17.
Figure 20:
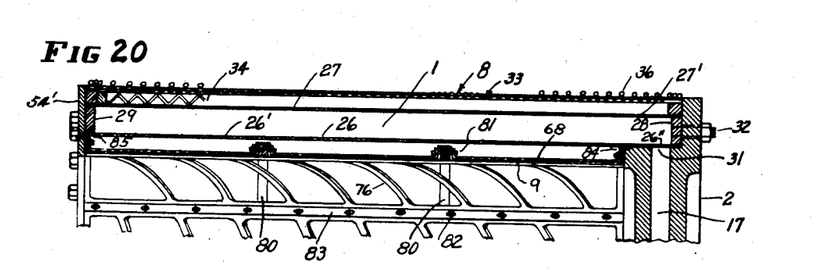
Fig. 20 is a section of the drum as taken along line 20—20 of Fig. 18.
Figures 20A, 20B:
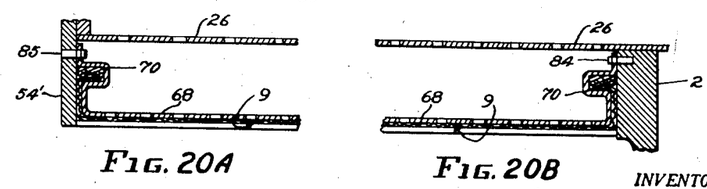
Figs. 20A and 20B are respectively enlarged views of opposite end portions of Fig. 20 to more clearly show the dowel pins.
Figure 21:
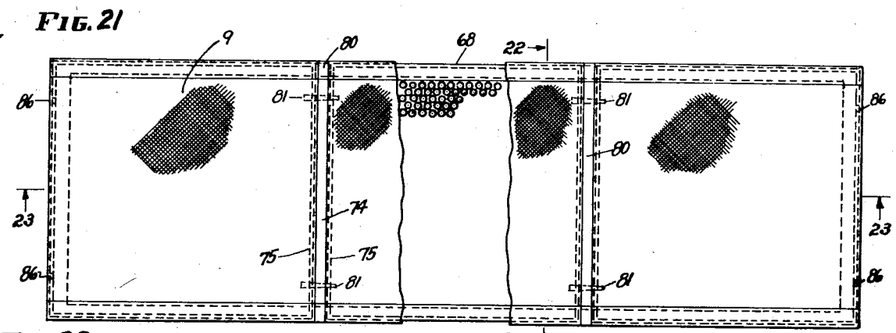
Fig. 21 is an inner plan view of one of the inner sectional screen assemblies with cloth covering in place.

The novel features over the preceding figures comprises a series of longitudinally extending bevel sided bars 67 secured to the inner surface of the inner drum shell 26, as by welding or otherwise, and which bars are aligned with compartment walls 30 as shown in Fig. 18 and the confronting beveled walls of each pair of bars 67 form a parallel sided opening to receive the interior screen frame assembly (68 to 75 inclusive) and provide for securing to the outer surfaces of the bars of a series of elongated rectangular grill frames 76 as by countersunk screws 77, the grill frames being curved to form a concentric surface within the drum and provided with a series of thin diagonally disposed ribs 78 forming the sludge scraper support or wearing surface, and the grill frames being further formed to overlap the margins of the interior screen sections as at 79 (Fig. 22) to hold them in place.

Figure 22:
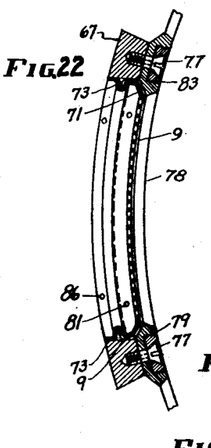
Fig. 22 is a cross section as taken on the line 22—22 of Fig. 21 and line 24—24 of Fig. 25 showing the complete assembly as posititioned in the drum.
Figures 23, 25:
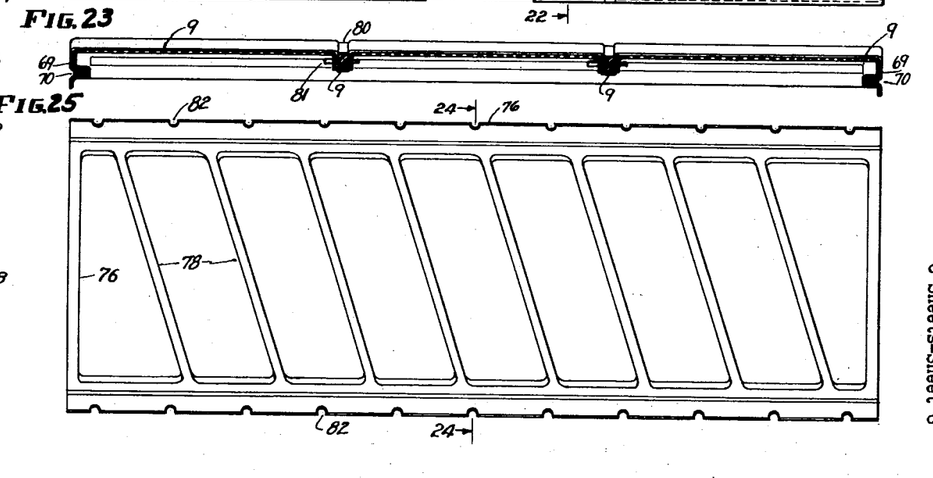
Fig. 23 is a longitudinal section on line 23—23 of Fig. 21.
Fig. 25 is an inside plan view of the grill frame.
Figure 24:
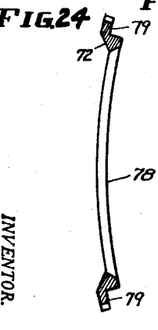
Fig. 24 is a cross section on line 24—24 of Fig. 25.

The screen sections comprise elongated rectangular perforated sheet metal panels 68 with end walls bent backwardly as shown in Fig. 23 at 69 and formed with a spring closing groove or slot 70 to receive the cloth covering 9, and side walls bent backward to the form shown in Fig. 22 to provide a beveled wall 71 to be engaged by a correspondingly beveled edge 72 of the grill frame, and a resilient slot 73 to tightly receive the cloth 9 which covers the concave inner face of the plate 68. Screen plate panel 68 is also formed with several transversely extending slots 74 with side walls 75 similar to the diagonal slots 41 described for plates 37, and likewise adapted to receive curved cloth stretching bars 80 indicated as in place in Fig. 21 with the cloth covering 9 of the screen section forced down under the bars 80 and with the bars held in place as by taper pins 81 passed through the bars and the walls 75 of the slots 74.

The cloth is applied in the same general manner as described for the screen sections of Fig. 9. The stretching bars 80 are flush with the cloth surface and insure it fitting smoothly against the concave surface of the perforated plate 68.

The covered panels fit snugly between beveled bars 67 and the grill frames 76 fit against the cloth covering and beveled edges of the screen panels and with the longitudinal margins 79 overlapping the bars 67 to the center, and are held in place by countersunk flat headed screws 77 seated in confronting notches 82 formed in the edges of the grills, after passing through washer bar 83.

The grill frames are in fact quite thin so that the inner scraper blade 11 of the drum will ride on the diagonal grill ribs 78 close to the interior cloth covering in removing the interior accumulation of sludge, in the same manner as described for the plates of Fig. 9.

This form of internal screen section may be removed by taking off the grill, or by simply loosening their screws and removing one or more end closing plates 54' and pulling the screen section out endwise. Though if desired dowel pins 84, 85 may be provided on both the head of the drum and on plates 54 to enter holes 86 formed in opposite end walls of the screen panels, but which of course makes it always necessary to insert and remove the sections endwise upon removal of end plates 54, all as will readily be understood by referring to the drawing Figs. 17, 18, 20, 22 and others.

In considering the above description and drawings it will be noted that one of the important features of the invention is the provision of a drum which is complete with its cylindrical wall, and that to such a cylinder there is applied a series of screen units taking the form of cylindrical screen segments, and which segments are removable while leaving the main drum shell complete.

Also that such segments are arranged and adapted to receive a cloth covering over a perforated or relatively rigid metal screen sheet.

Also that means is provided for stretching the cloth covering to follow even the concave surface of the inside of the segment screen sheets.

Also that provision is made for using a scraper blade adjacent the concave surface of the cloth covered screen sheet.

All the above features are new in the art insofar as is known, as well as the various features and details set out to make the apparatus practicable.

Also in referring to a "cloth" covering for the screens it is to be understood that this term "cloth" is not necessarily confined to textile cloth, as in some particular service it may be very fine "wire cloth," or other woven or felted materials having filtering value, when applied in the manner described, and the word is used in the claims with this intention.

Also to be noted is that while I have shown specific details for carrying out my improvements, changes may be made within the spirit of the invention and within the scope of my appended claims.

I therefore claim:

1. In a rotary drum filter of the character described having a cylindrical wall, a plurality of arched screen segments formed and adapted to collectively substantially cover said cylindrical wall, means adapted for securing a separate sheet of cloth over one side of each of the screen segments, and means for holding said cloth in contact over the surface of said screen segment and providing a series of spaced strips extending across said screen segment outward of said cloth forming tracks for a sludge scraping blade to bear against, and means for detachably securing said screen segments to said wall.

2. Detachable filter screen units for a rotary cylindrical drum type filter comprising a plurality of elongated screen panels each arched transversely to fit adjacent the cylindrical wall of the drum so as to collectively substantially cover the wall, means adapted for removably securing said screen panels in place, a series of spaced grooves extending transversely across each screen panel, a cloth covering over said panel, and a longitudinally curved bar for each groove arranged to fit tightly with and for forcing the cloth into said groove for tensioning the cloth and making it conform to said screen panel, the bars being of a size to project outwardly of the surface of the cloth to serve as a sliding support for a relatively fixed scraper blade adjacent the screen panels as they revolve with the drum in operation.

3. In a structure as set out in claim 2 said spaced grooves and bars extending at a slanting angle across the screen panel to avoid localized wear on a scraper blade when in sliding contact with the bars projecting therefrom.

4. In a rotary cylindrical drum type filter mounted horizontally for revolution about its axis and having a supporting head at one end of the drum and with the other end open, the improvement which comprises the cylindrical body of the drum formed of two spaced sheet metal cylindrical shells, means so spacing said cylindrical shells including an annular wall at each end of the drum closing the ends of the space between the shells, and longitudinally extending walls circumferentially spaced, and separating the space between the shells into inter-shell compartments, means securing the spaced shells at one end to the head of the drum, a cylindrical composite outer filtering sheet surrounding the outer cylindrical shell, means spacing said outer filtering sheet outwardly from the outer cylindrical shell, and means closing the space between said outer filtering sheet and the outer cylindrical shell at the ends of the shell and forming an outer filtering space, a cylindrical composite inner filtering sheet within the inner of said cylindrical shells and means spacing said inner filtering sheet inwardly therein including means closing the space between the inner filtering sheet and the inner shell at the ends of the shell and forming an inner filtering space, partition means separating the outer and inner filtering spaces into filtering compartments corresponding to the inter-shell compartments, openings through said shells for liquid to pass from the filtering compartments to the inter-shell compartments respectively, and means for creating suction in said compartments successively as the drum is revolved.

5. In the construction as set out in claim 4, said composite inner filtering sheet comprising a plurality of oblong perforated sheet metal panels in the form of segments of a cylinder covered with cloth on their concave side and corresponding in size and number to said intershell compartments fitting within the drum, and means removably securing said panels within the drum adjacent said inner sheet metal shell.

6. In a rotary cylindrical drum type filter mounted horizontally for revolution about its axis and having a supporting head at one end of the drum and with the other end open, the improvement which comprises a plurality of filter sections taking the form of elongated screen panels extending longitudinally of the drum and positioned with longitudinal edges adjacent to cover the interior cylindrical wall of the drum, said screen panels being transversely of arcuate form to fit within the drum and present a complete interior cylindrical surface when in position, means for so securing the screen panels in place, each of said screen panels covered on its concave interior surface with a sheet of cloth, and a series of spaced strips extending transversely of each screen panel projecting outward of the surface of said cloth to form tracks for a sludge scraper blade to ride upon as the drum revolves, and means holding said strips in place.

7. In a structure as set out in claim 6 said spaced strips being angularly arranged to form slantingly extending tracks for shifting their points of contact with the sludge scraper blade when used against the strips as the drum revolves.

8. In a structure as set out in claim 1, the means for detachably securing the screen segments to the drum wall comprising locking bars carried by the inner shell of the drum extending longitudinally and slidably of the drum adjacent the longitudinal edges of the screen segments provided with means engaging the end portions of the screen segment, and said bar provided with wedge means engaging said inner wall of the drum through slots formed therein to force the screen segments in place against said wall as the bar is moved longitudinally.

9. In a structure as set out in claim 1 said spaced strips extending at a slanting angle across the screen segment for equalizing any wear along the scraper blade.

10. In a structure as set out in claim 1, and relatively short spaced strips arranged in straddling relation to the junctures between said screen segments, forming a continuation of the bearing surface for a scraper blade in passing the junctures.

11. In a rotary cylindrical drum filter of the character described, a plurality of screen segments substantially covering the inner cylindrical wall of the drum, said segments each comprising a frame supporting a metal screen both arched to conform to the drum wall, a cloth covering the concave side of the metal screen, and a plurality of curved strips forcing the cloth substantially in continuous surface contact with the concave surface of said segment.

12. In a structure as set out in claim 6 said spaced strips tied at their ends by straight flanges forming therewith a grille frame adapted to be placed as a unit, against the cloth covered surface of each screen panel, and means for securing said grille frame in place.

13. In a structure as set out in claim 6 said spaced strips tied at their ends by straight flanges forming therewith a grille frame adapted to be placed as a unit, against the cloth covered surface of each screen panel, and means for securing said grille frame in place, said spaced strips extending at a slanted angle across said grille frame to avoid localized wear on a sludge scraper blade when used against the strips.

AMBROSE L. BURLESON.

REFERENCES CITED

The following references are of record in the file of this patent:

UNITED STATES PATENTS

| Number | Name | Date |
| --- | --- | --- |
| Re. 18,597 | Shimmin | Sept. 13, 1932 |
| 530,397 | Cone | Dec. 4, 1894 |
| 931,267 | Burt | Aug. 17, 1909 |
| 994,235 | Arbuckle | June 6, 1911 |
| 1,268,273 | Nicholas | June 4, 1918 |
| 1,636,739 | Hertenbein | July 26, 1927 |
| 1,851,809 | Carter | Mar. 29, 1932 |
| 1,917,696 | Budke | July 11, 1933 |
| 2,212,168 | Peterson | Aug. 20, 1940 |
| 2,259,235 | Weiss | Oct. 14, 1941 |

FOREIGN PATENTS

| Number | Country | Date |
| --- | --- | --- |
| 115,030 | Australia | Apr. 17, 1942 |
| 379,053 | Great Britain | Apr. 14, 1932 |
| 477,493 | Germany | June 10, 1929 |
| 546,591 | Germany | Mar. 16, 1932 |
| 617,782 | Germany | Aug. 26, 1935 |